(12) United States Patent  
Boberg et al.

(10) Patent No.: US 8,375,426 B2
(45) Date of Patent: Feb. 12, 2013

(54) METHOD AND ARRANGEMENT FOR HANDLING CLIENT DATA

(75) Inventors: Christer Boberg, Tungelsta (SE); Anders Lindgren, Älvsjö (SE); Mats Bergman, Lidingö (SE); Henrik Albertsson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 346 days.

(21) Appl. No.: 12/518,438

(22) PCT Filed: Dec. 11, 2006

(86) PCT No.: PCT/SE2006/001410
§ 371 (c)(1),
(2), (4) Date: Nov. 18, 2009

(87) PCT Pub. No.: WO2008/073006
PCT Pub. Date: Jun. 19, 2008

(65) Prior Publication Data
US 2010/0095362 A1 Apr. 15, 2010

(51) Int. Cl.
*G06F 7/14* (2006.01)

(52) U.S. Cl. .............. 726/7; 379/265.06; 726/6
(58) Field of Classification Search ....... 726/7; 713/201
See application file for complete search history.

(56) References Cited

U.S. PATENT DOCUMENTS

2004/0062383 A1* 4/2004 Sylvain ............... 379/265.06
2005/0071679 A1* 3/2005 Kiss et al. ............... 713/201

FOREIGN PATENT DOCUMENTS

WO    WO 03065701 A1    8/2003
WO    WO 2006038962 A1  4/2006

* cited by examiner

*Primary Examiner* — Nathan Flynn
*Assistant Examiner* — Phuoc Tran (57) ABSTRACT

A method and arrangement for authorizing an initially unauthorized watching client to receive client data of an observed client from a client data server. The watching client sends an expanded request for client data to the server. The expanded request contains additional information such as a text string, a picture, or a video/audio clip. The server extracts the additional information and sends it to the observed client. The observed client can then decide whether to authorize the watching client to receive the observed client's data based on the additional information.

28 Claims, 3 Drawing Sheets

METHOD AND ARRANGEMENT FOR HANDLING CLIENT DATA

TECHNICAL FIELD

The present invention relates generally to a method and arrangement for handling client data of an observed client by means of a client data server. In particular, the present invention can be used to provide information from a watching client initially not authorised to receive client data, when requesting or subscribing for client data of the observed client.

BACKGROUND

With the emergence of 3G mobile telephony, new packet-based communication technologies using IP (Internet Protocol) have been developed to support wireless communication of multimedia. For example, communication protocols in GPRS (General Packet Radio Service) and WCDMA (Wideband Code Division Multiple Access) support packet-switched multimedia services, as well as traditional circuit-switched voice calls.

A network architecture called "IP Multimedia Subsystem" (IMS) has been developed by the $3^{rd}$ Generation Partnership Project (3GPP) as a platform for handling multimedia services and sessions in the packet domain, based on IP transport. Thus, an IMS network can be used to initiate and control multimedia sessions for any IP enabled terminals being connected to any type of access networks. A signalling protocol called "SIP" (Session Initiation Protocol, according to the standard IETF RFC 3261) is typically used for handling sessions in IMS networks. A "SIP-enabled" terminal can thus use this standard to initiate and terminate multimedia communications by means of its home IMS network.

Figure 1:
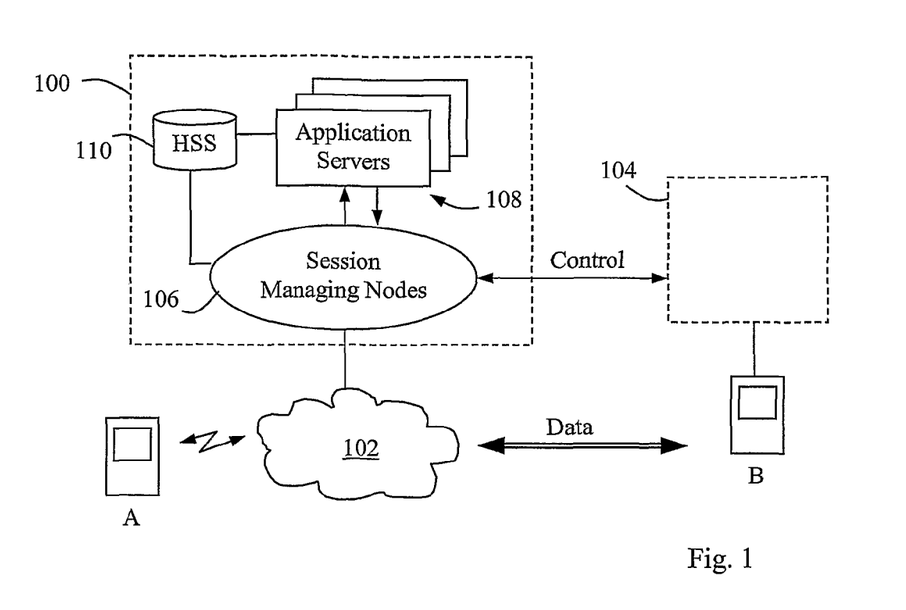
FIG. 1 is a schematic overview of a basic communication scenario involving two terminals and an IMS network, according to the prior art.

FIG. 1 is a simplified schematic illustration of a basic network structure for providing multimedia services by means of an IMS network 100 for a client using a terminal A. In this example, terminal A is a mobile terminal connected to a radio access network 102 and communicates in a multimedia session with another terminal B, even though IMS can be used for fixed terminals as well. Alternatively, terminal A may communicate with a content server or the like, e.g. for downloading some multimedia content therefrom. An IMS terminal is often generally referred to as "User Equipment (UE)".

The access network 102 is connected to IMS network 100, which is the "home" IMS network of terminal A and therefore handles the session for terminal A. Another similar IMS network 104 handles the session for terminal B. Basically, multimedia services are handled by the terminal's home IMS network even when roaming in a visited access network. In the shown example, terminals A and B belong to different IMS networks 100 and 104, respectively, although they may of course instead belong to the same IMS network.

The illustrated session is controlled by specific session managing nodes 106 in the IMS network 100. These nodes typically include S-CSCF (Serving Call Session Control Function), I-CSCF (Interrogating Call Session Control Function) and P-CSCF (Proxy Call Session Control Function), according to the conventional IMS architecture. Briefly described, a P-CSCF node acts as an entry point towards the IMS network 100 from access networks, a plurality of S-CSCF nodes are assigned to active terminals for managing their sessions using SIP signalling, and an I-CSCF node acts as a gateway for SIP messages from other IMS networks.

The IMS network 100 also includes one or more application servers 108 for various multimedia services, and a main database node HSS (Home Subscriber Server) 110 containing subscriber and authentication data. The various functions of the shown network elements 106-110 are generally known in the art, not necessary to describe here further to understand the context of the present invention.

In the figure, the thick two-way arrow illustrates the communication of payload data or "media" between the two terminals A and B, and the thin two-way arrow illustrates the communication of various control messages between the two IMS networks 100 and 104, typically according to SIP. Each application server 108 supports one or more specific multimedia services such as "Instant Messaging" (IM), "Push-to-talk over Cellular" (PoC) and "Presence", where SIP signalling is used to control sessions. In particular, presence services basically make data related to an observed client available to other watching clients.

In this description, the term "presence data", or generally "client data", is used to represent information on the state or situation of a client and his/her equipment in any predefined respect. Briefly described, presence data of a client is published by storage at an application server generally referred to as a "presence server", which can be supplied to other clients subscribing to that presence data. The presence data may refer to the following exemplary client states:

- A personal status, e.g. available, busy, in a meeting, on holiday, etc.
- A terminal status, e.g. switched on/off, engaged, out of coverage, etc.
- The geographic location of the client/terminal.
- Terminal capabilities, e.g. functionality for SMS, MMS, chat, IM, video, etc.
- Terminal selections, e.g. call forwarding, language, etc.
- Other client information, e.g. interests, occupations, personal characteristics, moods, personal logos, logo depending on the current mood, etc.

This type of information is continually stored in presence servers in the IMS network, based on publications of so-called "client events" received from clients or their access networks, whenever any presence data for a client is introduced, updated, changed or deleted. A client may thus also subscribe for selected presence data of one or more other clients which is also handled by an application server in the IMS network.

In this description, the term "client" will be used to generally represent a user equipment (or terminal) and its user. Further, the term "watching client" represents a client that subscribes or requests for presence data (sometimes also referred to as the "Watcher"), and the term "observed client" represents a client that publishes presence data (sometimes also referred to as the "Presentity") to be available for observation by authorised watching clients.

A SIP message called "SIP PUBLISH" is generally used by observed clients to send their presence data to the presence server for publication. Another SIP message called "SIP SUBSCRIBE" is used by watching clients to subscribe for presence data of observed clients. The SIP PUBLISH message can be used basically in four different cases, namely: 1) to initiate new data, 2) to "refresh" data (i.e. confirming that earlier initiated data continue to be valid), 3) to modify data, and 4) to terminate data no longer valid. The SIP SUBSCRIBE message can be used to obtain presence data either just once or on a regular basis, as determined by a time-out parameter that can be set in that message. If the time-out parameter is set to zero, a notification with requested presence data is obtained just once and the subscription is promptly terminated.

In order to obtain a subscription for presence data of an observed client, the watching client must be authorised by the observed client to receive such presence data, which is controlled by means of presence rules dictated for the observed client. A protocol called XCAP (XML Configuration Access Protocol) can be used to introduce, modify and delete presence authorisation rules in a presence rule database.

Figure 2:
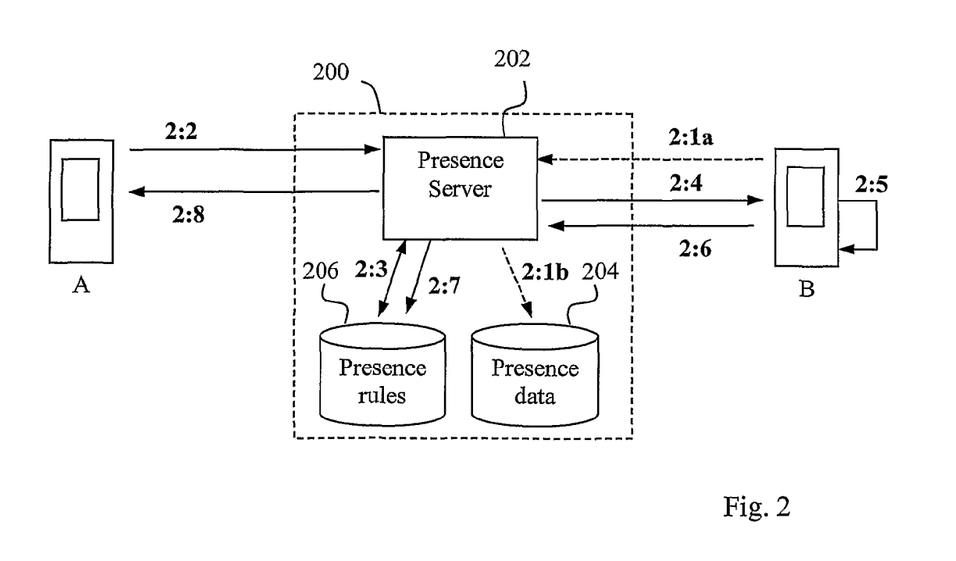
FIG. 2 is a block diagram illustrating a conventional procedure for obtaining presence data of an observed client, according to the prior art.

FIG. 2 illustrates a conventional procedure for obtaining a subscription for presence data, involving the user equipment A of a watching client and the user equipment B of an observed client belonging to an IMS network 200 comprising a presence server 202 acting for client B. The shown procedure is valid for a standard presence solution defined by OMA-PAG, based on various standards according to 3GPP and IETF-SIMPLE. As shown in the figure, clients A and B are represented by mobile terminals operated by users, even though the described procedure can be applied for fixed terminals as well. It is assumed that client A is initially unauthorised to receive presence data of client B.

A first step 2:1*a* generally illustrates that the observed client B publishes presence data by sending SIP PUBLISH messages to presence server 202 according to conventional routines, as described above. Certain data for client B can also be sent from client B's access network, e.g. location and terminal status data. The presence data for client B is maintained in a presence database 204, and step 2:1*b* illustrates that database 204 is updated accordingly in response to receiving the SIP PUBLISH messages of step 2:1*a*. Steps 2:1*a* and 2:1*b* continue throughout in the background, according to prevailing routines.

Client A now wants to obtain presence data of client B, but must be authorised to receive such data. Thus, a standard SIP SUBSCRIBE message is sent to the presence server 202 in a step 2:2, as a request for presence data of client B, which can be expressed as "SUBSCRIBE (Event package=presence, B)".

Upon receiving the SIP SUBSCRIBE message, the presence server 202 determines whether client A is authorised to receive data or not, by checking presence rules in a database 206, in a following step 2:3. If the rules in database 206 dictate that client A is "allowed", a SIP NOTIFY is sent to the watching client A with current presence information of the observed client B, but if client A is found to be "blocked", the subscription attempt is rejected. In this example, it is assumed that the presence rule database 206 contains no authorisation decision for client A, and the presence server may then be configured to send a reject message or simply ignore the request.

Another alternative currently developed, and being illustrated here, is that client B has earlier sent a subscription request (not shown) to presence server 202 for information on any attempts of unauthorised clients to get presence data, which can be expressed as "SUBSCRIBE (Event package=presence.winfo, B)". The presence server 202 thus notifies client B that client A has made a subscription attempt, by sending a SIP NOTIFY message to client B, in a next step 2:4, which can be expressed as "NOTIFY (Event package=presence.winfo, A)". Receiving the notification, client B can then decide whether client A should be authorised to receive the requested presence data or not, or optionally only selected parts thereof, by means of a suitable terminal input command as indicated in a step 2:5.

Next, client B responds to the notification of step 2:4 by sending an authorisation decision for client A to the presence server 202, in a following step 2:6, which may be sent in an XCAP PUT message. The authorisation decision could be any of: allow, reject, polite block, etc., which is stored as an authorisation rule in the presence rule database 206, in a step 2:7. If client B just ignores the message of step 2:4, the request would be naturally rejected.

In this example, client B actually allows client A to receive his/her presence data. The presence server 202 therefore finally sends an SIP NOTIFY message containing valid presence data of client B to client A, in a step 2:8, which can be expressed as "NOTIFY (Event package=presence, B)".

By notifying client B on the subscription attempt of client A, a subscription for presence data can be easily established by sending the initial standard SIP SUBSCRIBE message of step 2:2 above, provided that client B allows the subscription. However, the SIP NOTIFY message of step 2:4 to client B identifies the attempting client A only by a name or network address derived from the SIP SUBSCRIBE message of step 2:2, which the receiving user may not be able to recognise or understand. For example, if an identity of client A is given in the message that indicates a name, e.g. in the manner of "bengt.larsson@telia.com", client B may possibly recognise it, if known, but not that easily if the identity is given in the manner of "user1224@freeweb.com" or the like.

In order to overcome this limitation, client A can always contact client B separately to identify himself/herself and ask for permission, e.g. by means of a phone call, SMS, e-mail or other messaging mechanism. However, this additional communication would increase the network load and entail extra efforts and costs for the clients involved. Further, the observed client may not have the same type of messaging client capabilities or may be otherwise incompatible. Client B may also apply access restrictions to incoming messages allowing messages from known clients only, thereby preventing client A to communicate in this way if unknown.

SUMMARY

The object of the present invention is to address the problems outlined above. In particular, it is an object of the present invention to provide a solution that avoids the need for additional calls or messaging when trying to obtain presence information on an observed client. These objects and others may be obtained by using a method and arrangement according to the attached independent claims.

According to one aspect, the present invention provides a method of handling a request for client data of an observed client, as executed in a client data server capable of providing client data of the observed client to authorised watching clients. A subscription request has been received from the observed client for notifications on any unauthorised attempts to get client data. In this method, an expanded request for client data of the observed client is received from an initially unauthorised watching client, where the expanded client data request contains additional information that has been created or selected by the watching client to identify or present himself/herself in the client data request. After detecting that the watching client is unauthorised, the additional information is extracted from the expanded client data request, and an expanded notification is sent to the observed client on the unauthorised attempt of the watching client to get client data, where the expanded notification containing the extracted additional information.

The additional information may include a text string, a picture, a video/audio clip, or a link to a personal home page or to a downloadable file.

In response to the expanded notification, an authorisation decision may be received from the observed client that may include an additional message from the observed client which is then sent together with the requested client data in an expanded client data notification to the watching client. Alternatively, an additional message received separately from the observed client can be sent together with the requested client data in an expanded client data notification to the watching client.

The received expanded client data request may be a request for client data according to a list of plural observed clients, and may include either unique pieces of additional information valid for each observed client in the list, or a global piece of additional information valid for all observed clients in the list.

According to another aspect, the present invention provides an arrangement in a client data server for handling a request for client data of an observed client according to the client data server method above. The inventive client data server arrangement comprises a communication unit and a logic unit. The communication unit is adapted to receive an expanded request for client data of the observed client from an initially unauthorised watching client, where the expanded client data request contains additional information that has been created or selected by the watching client to identify or present himself/herself in the client data request. The logic unit is adapted to extract the additional information from the expanded client data request after detecting that the watching client is unauthorised. The communication unit is further adapted to send an expanded notification to the observed client on the unauthorised attempt of the watching client to get client data, containing the extracted additional information.

According to yet another aspect, the present invention provides a method of requesting for client data of an observed client, as executed in a user equipment of an initially unauthorised watching client. In the watching client method, an expanded request for client data of the observed client is created containing additional information that has been created or selected by the watching client to identify or present himself/herself in the client data request. The expanded client data request is then sent to a client data server capable of providing client data of the observed client to authorised watching clients.

As mentioned above, the expanded client data request may be a request for client data according to a list of plural observed clients, and the expanded client data request may include unique pieces of additional information for each client in the list or a global piece of additional information for all clients in the list.

According to yet another aspect, the present invention provides an arrangement in a user equipment of an initially unauthorised watching client, for making a request for client data of an observed client according to the user equipment method above. The inventive user equipment arrangement comprises a logic unit and a communication unit. The logic unit is adapted to create an expanded request for client data of the observed client, containing additional information that has been created or selected by the watching client to identify or present himself/herself in the client data request. The communication unit is adapted to send the expanded client data request to a client data server capable of providing client data of the observed client to authorised watching clients.

According to yet another aspect, the present invention also provides a method of handling a request for client data from an initially unauthorised watching client as executed in a user equipment of an observed client. In the observed client method, a subscription request for notifications on any unauthorised attempts to get client data is sent to a client data server capable of providing client data of the observed client to authorised watching clients. At some point later, an expanded notification on a client data request of the watching client is received from the client data server, containing additional information that has been created or selected by the watching client to identify or present himself/herself in the client data request. The additional information is then extracted from the expanded notification and presented to the observed client user.

According to a further aspect, the present invention also provides an arrangement in a user equipment of an observed client for handling a request for client data from an initially unauthorised watching client, comprising a communication unit, a logic unit, and a presenting unit. The communication unit is adapted to send a subscription request for notifications on any unauthorised attempts to get client data, to a client data server capable of providing client data of the observed client to authorised watching clients. The communication unit is further adapted to receive an expanded notification on a client data request of the watching client from the client data server, containing additional information that has been created or selected by the watching client to identify or present himself/herself in the client data request. The logic unit is adapted to extract the additional information from the expanded notification, and the presenting unit is adapted to present the extracted additional information.

The present invention enables the user at the observed client to take an authorisation decision for the watching client, considering the presented additional information. Thereby, it is possible to identify and assess an unauthorised watching client more easily, as compared to the prior art. The present invention can be implemented by using existing standard mechanisms without seriously impacting the traffic load nor requiring any extra network resources.

Further features of the present invention and its benefits can be understood from the detailed description below.

BRIEF DESCRIPTION OF THE DRAWINGS

The present invention will now be described in more detail by means of exemplary embodiments and with reference to the accompanying drawings, in which.

DETAILED DESCRIPTION

Briefly described, the present invention can be used for conveying additional information, such as a personal message or the like, to an observed client when requesting for presence information or client data, without requiring any additional communication for calls or messaging. A requesting client can include the additional information in an "expanded" request for client data of an observed client, e.g. as an SIP SUBSCRIBE message, which is sent to a client data server capable of supplying the requested client data.

The additional information may be a freely composed text string, such as: "Hi, this is Bob. We met at the pub last night". The additional information may also include any other information element created or selected by the requesting client, such as a picture, a video/audio clip, or a link to a personal home page or to a downloadable file. Thus, the client is free to select any piece of description, identification or other object to make up the additional information in the client data request.

When the client data server receives the expanded client data request, the additional information therein is detected and extracted for insertion in a likewise "expanded" client data request notification, e.g. an SIP NOTIFY message, which is sent to the observed client. The user equipment (or terminal) of the observed client then presents the additional information such that the user can take an authorisation decision for the requesting client, considering the presented additional information.

Thus, the user will then be able to identify and assess the requesting client more easily, as compared to receiving only a name or a network address in a regular notification. Moreover, no extra communication is needed to convey the additional information.

The term "presence data" will be used here to represent any client data that is made available, or "observed", according to the mechanisms described below. Further, the described "client data server" may be any server or functional entity capable of supplying client data of observed clients to watching clients, which could also be termed a "notifier" or the like.

Even though the following embodiments are generally described in terms of presence services, the invention is not limited thereto but can be implemented for any applications and services using the client data subscribe mechanism. Further, the presence server described below could be any server capable of providing requested client data to authorised watching clients.

In the following description, reference will be made to well-known SIP messages although the present invention is generally not limited thereto. An embodiment will now be described with reference to a signalling procedure in a block diagram shown in FIG. 3, using the same numerals as in FIG. 2 for a requesting/watching client A, an observed client B, a presence server 202, a presence database 204, and a rule database 206.

Figure 3:
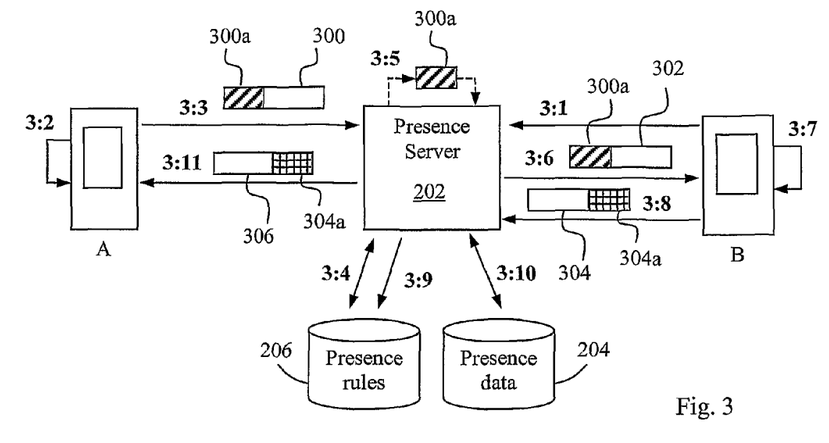
FIG. 3 is a block diagram illustrating a procedure for obtaining and providing presence data of an observed client, according to one embodiment.

The ongoing routine of maintaining updated presence data for client B, as shown by steps 2:1a and 2:1b in FIG. 2, is not shown here for simplicity. In a first step 3:1, client B sends a subscription request to presence server 202 for information on any attempts of unauthorised clients to get presence data, which can be expressed as "SUBSCRIBE (Event package=presence.winfo, B)".

A next step 3:2 illustrates that the user of client A creates an expanded request for presence data of client B by including additional information in the presence data request. If SIP signalling is used, it is only required that the additional information can be accommodated in an SIP SUBSCRIBE message, either in an existing header, in a new header, or as a part of the message body. The additional information may contain any message or description as exemplified above. The expanded presence data request 300 with the additional information 300a is then sent to the presence server 202, in a following step 3:3.

Upon receiving the presence data request 300, the presence server 202 checks in the presence rule database 206 whether the requesting client A is authorised to receive the requested data or not, in a step 3:4, and finds no authorisation decision in the presence rule database 206 for client A, thus being unauthorised. In accordance with the subscription request for information on unauthorised attempts to get presence data received in step 3:1, the presence server 202 is thus obliged to report the attempt of client A to client B.

Before reporting, presence server 202 extracts the additional information 300a from the received presence data request 300, as schematically illustrated in a further step 3:5. The presence server 202 then sends an expanded presence request notification 302 including the additional information 300a to client B, in a next step 3:6, which can be expressed as "NOTIFY (Event package=presence.winfo, A)". Again, if SIP signalling is used, it is only required that the additional information 300a can be accommodated in an SIP NOTIFY message, either in an existing header, in a new header, or as a part of the message body.

The user equipment (or terminal) of client B then presents the additional information 300a accordingly, in a further step 3:7, e.g. by displaying a text string, a picture, or a URL pointing to a home page or downloadable file, or by playing an audio message, etc. The user can then decide whether to authorise the requesting client A or not, considering the presented additional information. In this way, the observed client can hopefully identify and assess the requesting client more easily, as compared to receiving just a client identity that may not be recognised.

Client B is now free to respond to the presence request notification 302 by sending an authorisation decision 304 to presence server 202, in a following step 3:8. Optionally, client B may also insert an additional message 304a in the authorisation decision 304, to be sent to the watching client A in an expanded presence notification. Client B could also predefine certain standard messages for different categories of watchers (such as pending, allowed, blocked, polite blocked etc.), which can be automatically included in the authorisation decision 304 depending on the decision outcome.

Similar to step 2:6 described above, the authorisation decision 304 of step 3:8 may be sent in an XCAP PUT message, as any of: allow, reject, polite block, etc., which is normally used for changing presence authorisation rules. Once received by the presence server 202, the authorisation decision is stored as a rule in the presence rule database 206, in a step 3:9. If client B just ignores to respond to the presence request notification 302, client A will of course not be authorised although the request may remain until terminated by client A.

Accordingly, a rule may then also be introduced in database 206 marking client A as "ignored" or "rejected". In this example, however, client B has allowed client A to receive the requested presence data, which is retrieved from the presence database 204 in a further step 3:10.

Thereafter, the presence notification 306 is finally sent to client A in a step 3:11, containing valid presence data of client B and optionally also the added message 304a, which can be expressed as "NOTIFY (Event package=presence, B)". Again, if SIP signalling is used, it is only required that the optional additional message 304a can be accommodated in an expanded SIP NOTIFY message, either in an existing header, in a new header, or as a part of the message body. The step of extracting the additional message 304a from the authorisation decision 304 before sending it together with the presence notification 306 is not shown here for simplicity.

Another alternative would be that client B sends a separate SIP Message within the ongoing signalling dialogue, to convey a personal message to client A. Client B would then send the authorisation decision in a regular XCAP message allowing client A to watch presence data of client B, and also send the separate SIP Message containing the personal message to the presence server 202. When receiving the "allow" XCAP message, the presence server 202 will take the personal message in the SIP Message and include it in the presence notification 306 to client A.

Figure 4:
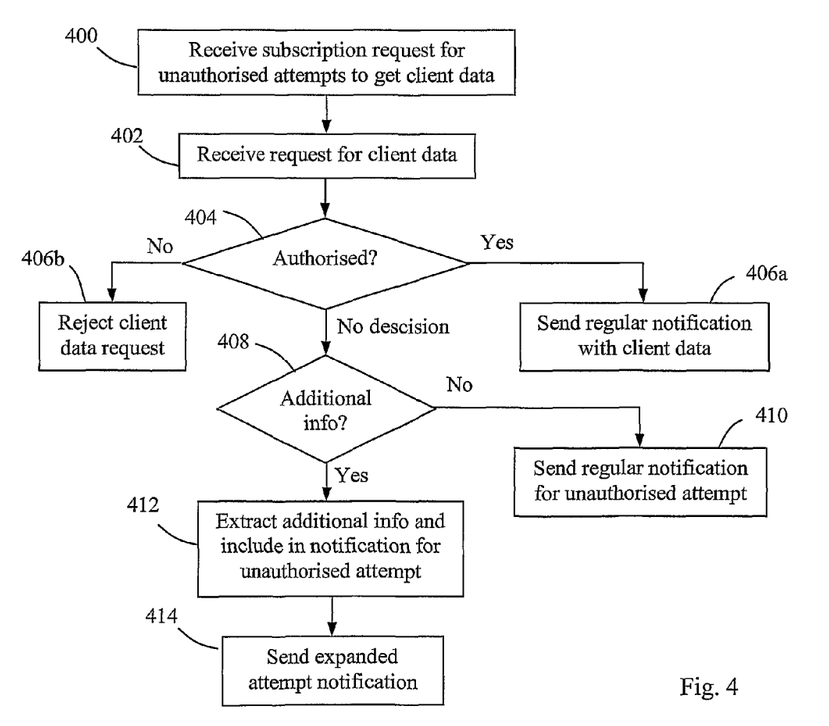
FIG. 4 is a flow chart with steps in a procedure executed by a client data server for handling a request for client data of an observed client, according to another embodiment.

A procedure for handling a request for presence data of an observed client according to another embodiment, will now be described with reference to the flow chart shown in FIG. 4. The described procedure is generally executed in a client data server capable of providing client data of observed clients to authorised watching clients, which may be a presence server or the like as in the example above. In a first step 400, a subscription request is received from an observed client for notifications on any unauthorised attempts to get client data of the observed client (basically corresponding to step 3:1 in FIG. 3). It is assumed that the client data server stores data of the observed client, that can be supplied to any authorised watching client upon request.

At some point thereafter, a request for client data of the observed client is received from a watching client in a next step 402 (basically corresponding to step 3:3 in FIG. 3). In a step 404, it is then checked in a rule database or the like whether the watching client is authorised to receive such client data of the observed client (basically corresponding to step 3:4 in FIG. 3).

At this point, three different outcome results are basically possible in step 404: Firstly, if the watching client is found to be authorised (Yes), valid client data is sent to the watching client in a regular notification in a step 406a. Secondly, if the watching client is registered in the rule database as unauthorised (No), the client data request is rejected in a step 406b, which may entail a suitable rejection message to the watching client.

Thirdly, if no authorisation decision whatsoever is found in the rule database for the watching client (No decision), it is checked in a further step 408 whether any additional information is included in the client data request received in step 402. If not, a regular notification for the unauthorised attempt is sent to the observed client in a next step 410 (basically corresponding to step 2:4 in FIG. 2), thus only including an address or name of the watching client as normally given in the regular client data request, which may well be unrecognised by the observed client when received.

However, if additional information is indeed found in the client data request received in step 402, e.g. a text string, a link to a homepage, etc., the additional information is extracted from the request in a further step 412, (basically corresponding to step 3:5 in FIG. 3) for inclusion in a notification for the unauthorised attempt. Finally, the expanded attempt notification including the additional information is sent to the observed client in a last illustrated step 414 (basically corresponding to step 3:6 in FIG. 3). Thereby, the observed client can regard the additional information to identify and assess the requesting client.

As similar to FIG. 3, the procedure may continue from there as the observed client responds to the expanded attempt notification of step 414, according to various alternatives and options, e.g., depending on how the observed client responds, if at all.

Figure 5:
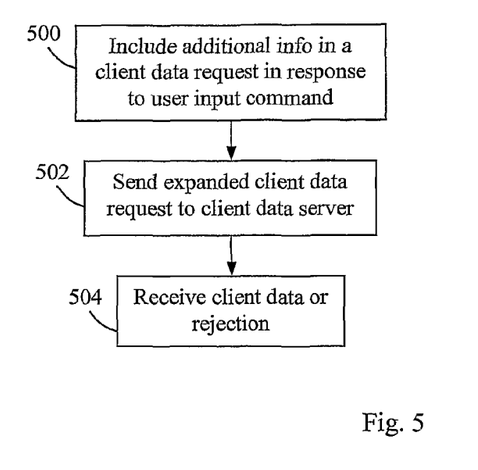
FIG. 5 is a flow chart with steps in a procedure executed by a user equipment of a watching client for obtaining client data of an observed client, according to yet another embodiment.

FIG. 5 is a flow chart with steps in a basic procedure executed by a user equipment of a watching client for obtaining client data of an observed client, according to yet another embodiment. In a first step 500, an expanded request for client data of the observed client is created including additional information, in response to a user input command for obtaining the client data. The additional information has been created or selected by the watching client, e.g. to identify or present himself/herself to the observed client in the client data request.

In a next step 502, the created client data request is sent to a client data server adapted to provide client data of the observed client to any authorised watching client, which may be a presence server or the like.

Finally, the requested client data or a rejection is received in a step 504 from the client data server, in response to the client data request sent in step 502. Thus, the requested client data is received if the observed client has decided to authorise the watching client, but if not, a rejection is received.

Figure 6:
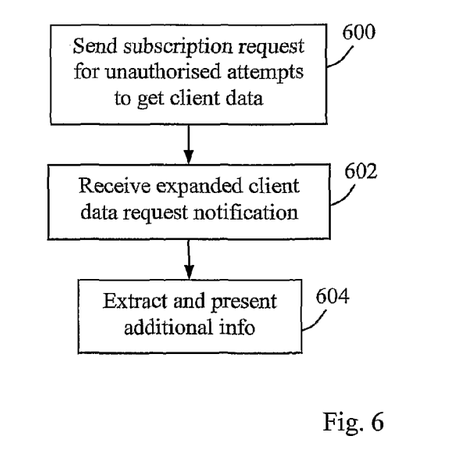
FIG. 6 is a flow chart with steps in a procedure executed by a user equipment of an observed client for handling a request from a watching client for client data, according to yet another embodiment.

FIG. 6 is a flow chart with steps in a basic procedure executed by a user equipment of an observed client for handling a request from a watching client for client data, according to yet another embodiment. In a first step 600, a subscription request for information on any attempts of unauthorised clients to get client data, is sent (in response to a user command) to a client data server adapted to provide client data of the observed client to authorised watching clients. As in the embodiments described above, the client data server may be a presence server or the like.

In a next step 602, an expanded notification on a client data request of a watching client is received at some point, the notification containing additional information that has been included in the client data request by the watching client.

Finally, the additional information is extracted from the expanded notification of an observed client and presented by the user equipment, in a step 604. The additional information extracted from the expanded client data request notification may be presented visually and/or audibly, depending on the format.

Figure 7:
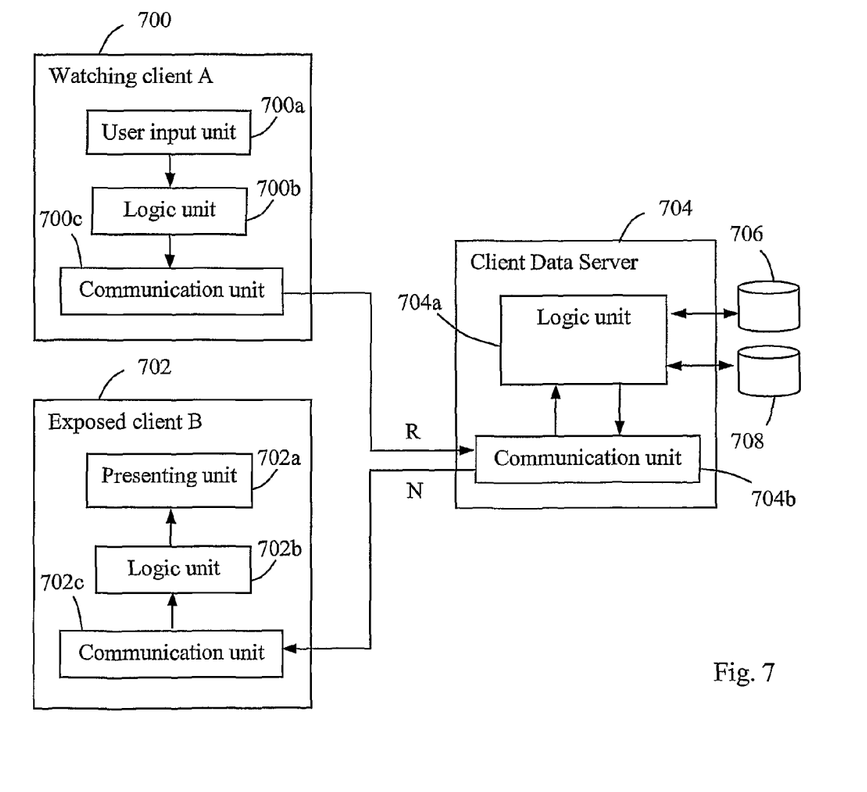
FIG. 7 is a block diagram illustrating a user equipment of a watching client, a user equipment of an observed client, and a client data server capable of providing client data of the observed client, according to further embodiments.

FIG. 7 is a block diagram illustrating a user equipment 700 of an initially unauthorised watching client A, a user equipment 702 of an observed client B, and a client data server 704 capable of providing client data of the observed client, according to further embodiments.

The user equipment 700 of the watching client A includes an arrangement for requesting for client data of the observed client B, basically comprising a user input unit 700a, a logic unit 700b and a communication unit 700c. The user input unit 700a is used for receiving user input commands for creating a client data request.

The logic unit 700b is adapted to create an expanded request for client data of the observed client, in response to a user input command received by the user input unit 700a. The expanded request contains additional information that has been created or selected by the watching client to identify or present himself/herself in the client data request. The communication unit 702c is adapted to send the expanded client data request R to the client data server 704.

The client data server 704 includes an arrangement for handling requests for client data when a subscription request has been received from the observed client for notifications on any unauthorised attempts to get client data, basically comprising a logic unit 704a and a communication unit 704b.

The communication unit 704b is adapted to receive the expanded client data request R from the watching client A. The logic unit 704a is adapted to extract the additional information from the expanded client data request, after detecting that the watching client is unauthorised by checking a rule database 706 for the observed client B. The communication unit 704*b* is further adapted to send an expanded notification N to the observed client on the unauthorised attempt of the watching client to get client data, said expanded notification containing the extracted additional information.

The user equipment 702 of the observed client B includes an arrangement for handling the request for client data from the watching client A, basically comprising a presenting unit 702*a*, a logic unit 702*b*, and a communication unit 702*c*.

The communication unit 702*c* is adapted to send a subscription request S to the client data server 704 for notifications on any unauthorised attempts to get client data, and to receive an expanded notification N on a client data request of the watching client, said expanded notification containing additional information that has been created or selected by the watching client to identify or present himself/herself in the client data request. The logic unit 702*b* is adapted to extract the additional information from the expanded notification, and the presenting unit 702*a* is adapted to present the extracted additional information.

If the observed client B decides to authorise the watching client to receive the requested client data, the logic unit 704*a* can retrieve client data from a client database 708, and the communication unit 704*b* can send the retrieved client data to the watching client A.

It should be noted that the different elements in the nodes 700, 702 and 704 shown in FIG. 7 are described in terms of their logic functions, which can be implemented by the skilled person by means of various hardware and software in any suitable manner.

The present invention can also be used when a watching client subscribes or requests for client data according to a list of plural observed clients, wherein the same notification mechanism for client data information is used. However, a list subscription is different since the same subscription is used for multiple observed clients. Client data may then be obtained from plural client data servers associated with respective observed clients in the list.

A list subscription can be created "ad-hoc", i.e. a list of clients is included in the body of the subscription request. Alternatively, a list subscription can be created based on a pre-defined list of clients, which can be stored in an XCAP server and retrieved by the client data server when a list identifier is included in the client data request.

In both cases, it is possible to specify in the client data request either unique pieces of additional information to each observed client, or a global piece of additional information valid for all observed clients in the list. This can be done by including the additional information in the request either in an existing header, or as an additional header, or as a part of the request message body as in the case of individual client data requests as described above.

If the additional information is unique per client, different pieces of additional information must be included in the request where each piece of additional information points to a specific observed client. In the case of pre-defined pieces of additional information, they can be created once and stored in the XCAP server. A so-called Resource List server (RLS) can then be used for extracting the different pieces of additional information from the client data request, to include it in a client data request or presence subscription towards each presence server of the respective clients. Each presence server will then use the mechanism provided by means of the present invention. Moreover, if a global message is used, it can be created once and used for any new observed clients that may be added to the list.

By presenting the additional information at the observed client, it becomes possible to identify and assess the requesting client more easily, as compared to using only a name or a network address in a regular notification according to the prior art. Thus, the user at the observed client can take an authorisation decision for the watching client, considering the presented additional information.

Further, the present invention can be implemented by using existing standard mechanisms without seriously impacting the traffic load nor requiring any extra network resources. As described above, the present invention can be used when subscribing to individual observed clients as well as to lists of plural observed clients. By incorporating the additional information in the client data request or presence request, it is not necessary to coordinate any separate messaging in the solution for achieving this functionality.

While the invention has been described with reference to specific exemplary embodiments, the description is generally only intended to illustrate the inventive concept and should not be taken as limiting the scope of the invention, which is defined by the appended claims. The IMS technology and the SIP signalling protocol have been frequently used when describing the above embodiments, although any other standards and protocols for enabling the above-described functions and services may basically be used.

The invention claimed is:

1. A method of handling a request for presence data of an observed client, as executed in a presence server that provides presence data of the observed client to authorized watching clients, wherein a subscription request has been received from the observed client for notifications on any unauthorized attempts to get presence data, the method comprising the steps of:

receiving from an initially unauthorized watching client, an expanded Session Initiation Protocol (SIP) SUBSCRIBE message containing a request for presence data of the observed client, the expanded SIP SUBSCRIBE message including additional information that has been created or selected by the watching client to identify the watching client more completely than a standard SIP SUBSCRIBE message;

detecting that the watching client is unauthorized;

extracting the additional information from the expanded SIP SUBSCRIBE message after detecting that the watching client is unauthorized; and sending an expanded SIP NOTIFY message to the observed client notifying the observed client of the unauthorized attempt of the watching client to get presence data, the expanded SIP NOTIFY message containing the extracted additional information, thereby increasing the chance that a user of the observed client will approve the request for presence data.

2. The method according to claim 1, wherein the detecting step includes detecting that the watching client is unauthorized by checking a rule database for the observed client.

3. The method according to claim 1, further comprising receiving an authorization decision from the observed client in response to the expanded SIP NOTIFY message.

4. The method according to claim 3, wherein the received authorization decision authorizes the watching client to receive the requested presence data and includes an additional message from the observed client, and the method further comprises sending the additional message together with the requested presence data in a second expanded SIP NOTIFY message to the watching client.

5. The method according to claim 3, wherein the received authorization decision authorizes the watching client to receive the requested presence data, and the method further comprises receiving an additional message separately from the observed client, wherein the server sends the additional message together with the requested presence data in a second expanded SIP NOTIFY message to the watching client.

6. The method according to claim 1, wherein the expanded SIP SUBSCRIBE message accommodates the additional information either in an existing header, in a new header, or as a part of the expanded SIP SUBSCRIBE message body, and the expanded SIP NOTIFY message accommodates the additional information either in an existing header, in a new header, or as a part of the expanded SIP NOTIFY message body.

7. The method according to claim 1, wherein the additional information includes any of: a text string, a picture, a video/audio clip, a link to a personal home page, and a link to a downloadable file.

8. The method according to claim 1, wherein the received expanded SIP SUBSCRIBE message includes a request for presence data according to a list of a plurality of observed clients.

9. The method according to claim 8, wherein the list is an ad-hoc list or a predefined list of observed clients indicated by a list identifier included in the expanded SIP SUBSCRIBE message, wherein the predefined list is stored in an XCAP server and retrieved by the presence server using the list identifier included in the expanded SIP SUBSCRIBE message.

10. The method according to claim 8, wherein the received expanded SIP SUBSCRIBE message includes either unique pieces of additional information valid for each observed client in the list, or a global piece of additional information valid for all observed clients in the list.

11. An arrangement in a presence server for handling a request for presence data of an observed client, the arrangement providing presence data of the observed client to authorized watching clients, wherein a subscription request has been received from the observed client for notifications on any unauthorized attempts to get presence data, the arrangement comprising:
a communication unit; and
a logic unit in communication with the communication unit;
wherein:
the communication unit is configured to receive from an initially unauthorized watching client, an expanded Session Initiation Protocol (SIP) SUBSCRIBE message containing a request for presence data of the observed client, the expanded SIP SUBSCRIBE message including additional information that has been created or selected by the watching client to identify the watching client more completely than a standard SIP SUBSCRIBE message;
the logic unit is configured to detect that the watching client is unauthorized and to extract the additional information from the expanded SIP SUBSCRIBE message after detecting that the watching client is unauthorized; and
the communication unit is further adapted to send an expanded SIP NOTIFY message to the observed client notifying the observed client of the unauthorized attempt of the watching client to get presence data, the expanded SIP NOTIFY message containing the extracted additional information, thereby increasing the chance that a user of the observed client will approve the request for presence data.

12. The arrangement according to claim 11, wherein the logic unit is configured to detect that the watching client is unauthorized by checking a rule database for the observed client.

13. The arrangement according to claim 11, wherein the communication unit is further adapted to receive an authorization decision from the observed client in response to the expanded SIP NOTIFY message.

14. The arrangement according to claim 13, wherein the received authorization decision authorizes the watching client to receive the requested presence data and includes an additional message from the observed client, and wherein the communication unit is adapted to send the additional message together with the requested presence data in a second expanded SIP NOTIFY message to the watching client.

15. The arrangement according to claim 14, wherein the received authorization decision authorizes the watching client to receive the requested presence data, and wherein the communication unit is adapted to receive an additional message separately from the observed client, and to send the additional message together with the requested presence data in a second expanded SIP NOTIFY message to the watching client.

16. The arrangement according to claim 11, wherein the expanded SIP SUBSCRIBE message accommodates the additional information either in an existing header, in a new header, or as a part of the expanded SIP SUBSCRIBE message body, and the expanded SIP NOTIFY message accommodates the additional information either in an existing header, in a new header, or as a part of the expanded SIP NOTIFY message body.

17. The arrangement according to claim 11, wherein the additional information includes any of: a text string, a picture, a video/audio clip, a link to a personal home page, and a link to a downloadable file.

18. A method of requesting presence data of an observed client, as executed in a user equipment of an initially unauthorized watching client, the method comprising the steps of:
creating or selecting expanded identifying information to identify the watching client more completely than the information in a standard Session Initiation Protocol (SIP) SUBSCRIBE message containing a request for presence data;
creating an expanded SIP SUBSCRIBE message containing an expanded request for presence data of the observed client, the expanded containing the expanded identifying information; and
sending the expanded SIP SUBSCRIBE message to a presence server that provides presence data of the observed client to authorized watching clients, thereby increasing the chance that a user of the observed client will approve the expanded presence data request.

19. The method according to claim 18, wherein the expanded SIP SUBSCRIBE message accommodates the additional information either in an existing header, in a new header, or as a part of the expanded SIP SUBSCRIBE message body.

20. The method according to claim 18, wherein the expanded presence data request is a request for presence data according to a list of a plurality of observed clients.

21. The method according to claim 20, wherein the list is an ad-hoc list or a predefined list of observed clients indicated by a list identifier included in the expanded SIP SUBSCRIBE message, wherein the predefined list is stored in an XCAP server and retrieved by the presence server using the list identifier included in the expanded SIP SUBSCRIBE message.

22. The method according to claim 20, wherein the expanded SIP SUBSCRIBE message includes either unique pieces of additional information valid for each observed client in the list, or a global piece of additional information valid for all observed clients in the list.

23. An arrangement in a user equipment of an initially unauthorized watching client, for making a request for presence data of an observed client, the arrangement comprising:
a communication unit; and
a logic unit in communication with the communication unit;
wherein:
the logic unit is configured to create an expanded Session Initiation Protocol (SIP) SUBSCRIBE message containing a request for presence data of the observed client, the expanded SIP SUBSCRIBE message containing additional information that has been created or selected by the watching client to identify the watching client more completely than the information in a standard SIP SUBSCRIBE message requesting presence data; and
the communication unit is configured to send the expanded SIP SUBSCRIBE message to a presence server that provides presence data of the observed client to authorized watching clients, thereby increasing the chance that a user of the observed client will approve the presence data request.

24. A method of handling a request for client presence data from an initially unauthorized watching client, as executed in a user equipment of an observed client, the method comprising the steps of:
sending to a presence server, a subscription request for notifications on any unauthorized attempts to get presence data, wherein the presence server provides presence data of the observed client to authorized watching clients;
receiving from the presence server, an expanded Session Initiation Protocol (SIP) NOTIFY message notifying the observed client of a presence data request by the unauthorized watching client, the expanded SIP NOTIFY message containing additional information for identifying the unauthorized watching client more completely than the information in a standard SIP NOTIFY message;
extracting the additional information from the expanded SIP NOTIFY message; and
presenting the extracted additional information to a user of the observed client, thereby increasing the chance that a user of the observed client will approve the presence data request.

25. The method according to claim 24, wherein the SIP NOTIFY message accommodates the additional information either in an existing header, in a new header, or as a part of the SIP NOTIFY message body.

26. The method according to claim 24, further comprising sending an authorization decision message to the presence server authorizing the watching client to receive the requested presence data upon receiving an indication from the user that the watching client is authorized, the authorization decision message including an additional message to the watching client from the observed client.

27. The method according to claim 24, further comprising:
sending an authorization decision message to the presence server authorizing the watching client to receive the requested presence data upon receiving an indication from the user that the watching client is authorized; and
separately sending to the presence server, an additional message for the watching client.

28. An arrangement in a user equipment of an observed client, for handling a request for presence data from an initially unauthorized watching client, the arrangement comprising:
a communication unit;
a presenting unit; and
a logic unit in communication with the communication unit and the presenting unit;
wherein:
the communication unit is adapted to send a subscription request for notifications on any unauthorized attempts to get presence data, to a presence server that provides presence data of the observed client to authorized watching clients; and
the communication unit is adapted to receive from the presence server, an expanded Session Initiation Protocol (SIP) NOTIFY message notifying the observed client of a presence data request by the unauthorized watching client, the expanded SIP NOTIFY message containing additional information for identifying the unauthorized watching client more completely than the information in a standard SIP NOTIFY message;
the logic unit is adapted to extract the additional information from the expanded SIP NOTIFY message; and
the presenting unit is adapted to present the extracted additional information to a user of the observed client, thereby increasing the chance that a user of the observed client will approve the presence data request.

* * * * *

UNITED STATES PATENT AND TRADEMARK OFFICE
CERTIFICATE OF CORRECTION

| | | |
|---|---|---|
| PATENT NO. | : 8,375,426 B2 | Page 1 of 1 |
| APPLICATION NO. | : 12/518438 | |
| DATED | : February 12, 2013 | |
| INVENTOR(S) | : Boberg et al. | |

It is certified that error appears in the above-identified patent and that said Letters Patent is hereby corrected as shown below:

In the Claims:

In Column 15, Line 26, in Claim 24, delete "client presence" and insert -- presence --, therefor.

Signed and Sealed this
Sixteenth Day of July, 2013

Teresa Stanek Rea
*Acting Director of the United States Patent and Trademark Office*